United States Patent
Cohen et al.

(10) Patent No.: US 10,637,898 B2
(45) Date of Patent: Apr. 28, 2020

(54) AUTOMATIC SPEAKER IDENTIFICATION IN CALLS

(71) Applicant: AffectLayer, Inc., Tel Aviv-Jaffa (IL)

(72) Inventors: Raphael Cohen, Beer Sheva (IL); Erez Volk, Rehovot (IL); Russell Levy, Raanana (IL); Micha Yochanan Breakstone, Raanana (IL)

(73) Assignee: AffectLayer, Inc., Tel Aviv-Jaffa (IL)

( * ) Notice: Subject to any disclaimer, the term of this patent is extended or adjusted under 35 U.S.C. 154(b) by 23 days.

(21) Appl. No.: 15/604,513

(22) Filed: May 24, 2017

(65) Prior Publication Data
US 2018/0342250 A1    Nov. 29, 2018

(51) Int. Cl.
| | |
|---|---|
| G10L 17/00 | (2013.01) |
| H04L 29/06 | (2006.01) |
| G06Q 30/02 | (2012.01) |
| G10L 17/04 | (2013.01) |
| G10L 21/0272 | (2013.01) |
| G10L 15/06 | (2013.01) |

(52) U.S. Cl.
CPC ....... *H04L 65/403* (2013.01); *G06Q 30/0201* (2013.01); *G10L 17/005* (2013.01); *G10L 17/04* (2013.01); *G10L 21/0272* (2013.01); *G10L 15/06* (2013.01); *G10L 2015/0631* (2013.01); *H04M 2203/40* (2013.01); *H04M 2203/407* (2013.01)

(58) Field of Classification Search
None
See application file for complete search history.

(56) References Cited

U.S. PATENT DOCUMENTS

| | | | | | |
|---|---|---|---|---|---|
| 5,659,662 | A | * | 8/1997 | Wilcox | G06K 9/6219 704/243 |
| 6,424,946 | B1 | * | 7/2002 | Tritschler | G06F 17/3074 704/251 |
| 6,748,356 | B1 | * | 6/2004 | Beigi | G10L 17/04 704/245 |
| 7,620,547 | B2 | * | 11/2009 | Kompe | G10L 15/065 704/243 |
| 7,739,114 | B1 | * | 6/2010 | Chen | G10L 17/00 704/270 |
| 7,937,269 | B2 | * | 5/2011 | Aggarwal | G10L 15/063 704/231 |
| 7,940,897 | B2 | * | 5/2011 | Khor | G06Q 30/02 379/88.02 |

(Continued)

*Primary Examiner* — Richard Z Zhu
(74) *Attorney, Agent, or Firm* — Perkins Coie LLP

(57) ABSTRACT

A speaker identification system ("system") automatically assigns a speaker to voiced segments in a conversation, without requiring any previously recorded voice sample or any other action by the speaker. The system enables unsupervised learning of speakers' fingerprints and using such fingerprints for identifying a speaker in a recording of a conversation. The system identifies one or more speakers, e.g., representatives of an organization, who are in conversation with other speakers, e.g., customers of the organization. The system processes recordings of conversations between a representative and one or more customers to generate multiple voice segments having a human voice, identifies the voice segments that have the same or a similar feature, and determines the voice in the identified voice segments as the voice of the representative.

30 Claims, 7 Drawing Sheets

(56) References Cited

U.S. PATENT DOCUMENTS

| | | | | |
|---|---|---|---|---|
| 8,515,025 B1* | 8/2013 | Hewinson | H04M 3/56 | |
| | | | 379/142.01 | |
| 8,554,563 B2* | 10/2013 | Aronowitz | G10L 17/02 | |
| | | | 704/245 | |
| 8,612,224 B2* | 12/2013 | Breslin | G10L 17/00 | |
| | | | 704/243 | |
| 9,596,349 B1* | 3/2017 | Hernandez | H04M 3/5175 | |
| 2003/0154072 A1* | 8/2003 | Young | G06F 17/30017 | |
| | | | 704/9 | |
| 2010/0086108 A1* | 4/2010 | Jaiswal | G10L 17/005 | |
| | | | 379/88.04 | |
| 2011/0217021 A1* | 9/2011 | Dubin | H04N 7/147 | |
| | | | 386/278 | |
| 2014/0006026 A1* | 1/2014 | Lamb | G10L 17/00 | |
| | | | 704/246 | |
| 2014/0222428 A1* | 8/2014 | Cumani | G10L 17/02 | |
| | | | 704/250 | |
| 2014/0337034 A1* | 11/2014 | John | G10L 25/48 | |
| | | | 704/270 | |
| 2015/0025887 A1* | 1/2015 | Sidi | G10L 17/02 | |
| | | | 704/245 | |
| 2016/0275952 A1* | 9/2016 | Kashtan | G10L 17/00 | |
| 2018/0082689 A1* | 3/2018 | Khoury | G10L 17/04 | |
| 2018/0211670 A1* | 7/2018 | Gorodetski | G10L 17/04 | |
| 2018/0254051 A1* | 9/2018 | Church | G10L 21/028 | |

* cited by examiner

AUTOMATIC SPEAKER IDENTIFICATION IN CALLS

BACKGROUND

Automatic speech recognition techniques allow extracting business insights from telephone conversations with customers of an organization. This data allows improving sales and customer success, Customer Support, Marketing and Product functions (e.g., to understand and hear the "voice of the customer") by providing coaching to representatives of the organization, e.g., on desired behaviors, measuring compliance and generating data regarding market and product requirements automatically. Such data can also be used for determining best practices by identifying winning patterns, making sales process more efficient by summarizing calls so that the representatives can have less sync meetings, and for guiding conversations in real-time. Attributing utterances and words to the person who spoke them is useful for any downstream analysis such as search, call visualization, identifying buying cues, extracting customer pain points, identifying good/bad sales behaviors, and extracting notes and tasks.

When a call is recorded as a single channel (mono), or when multiple speakers are co-located in the same room, identifying the speaker requires applying various algorithmic techniques. Previous technologies aim to split the call between different speakers, an approach termed "diarization", e.g., determine that a particular voice is of "speaker 1," on the call; another voice is of "speaker 2" on the call, another voice is of "speaker 3" on the call, and so on. Such technologies may not identify those speakers. Some other technologies use multi-channel recordings in which each of the speakers in the conversation is on a separate communication channel and the speakers can be identified based on the channel assigned to the speaker. However, such technologies may not work in a single channel recording.

Some technologies may identify the speakers, but they need to record a short voice sample for creating a speaker fingerprint and use this speaker fingerprint to identify the speakers. However, this requires active participation of the recorded user which can hurt adoption rates and provide a non-smooth user experience.

DETAILED DESCRIPTION

Figure 1:
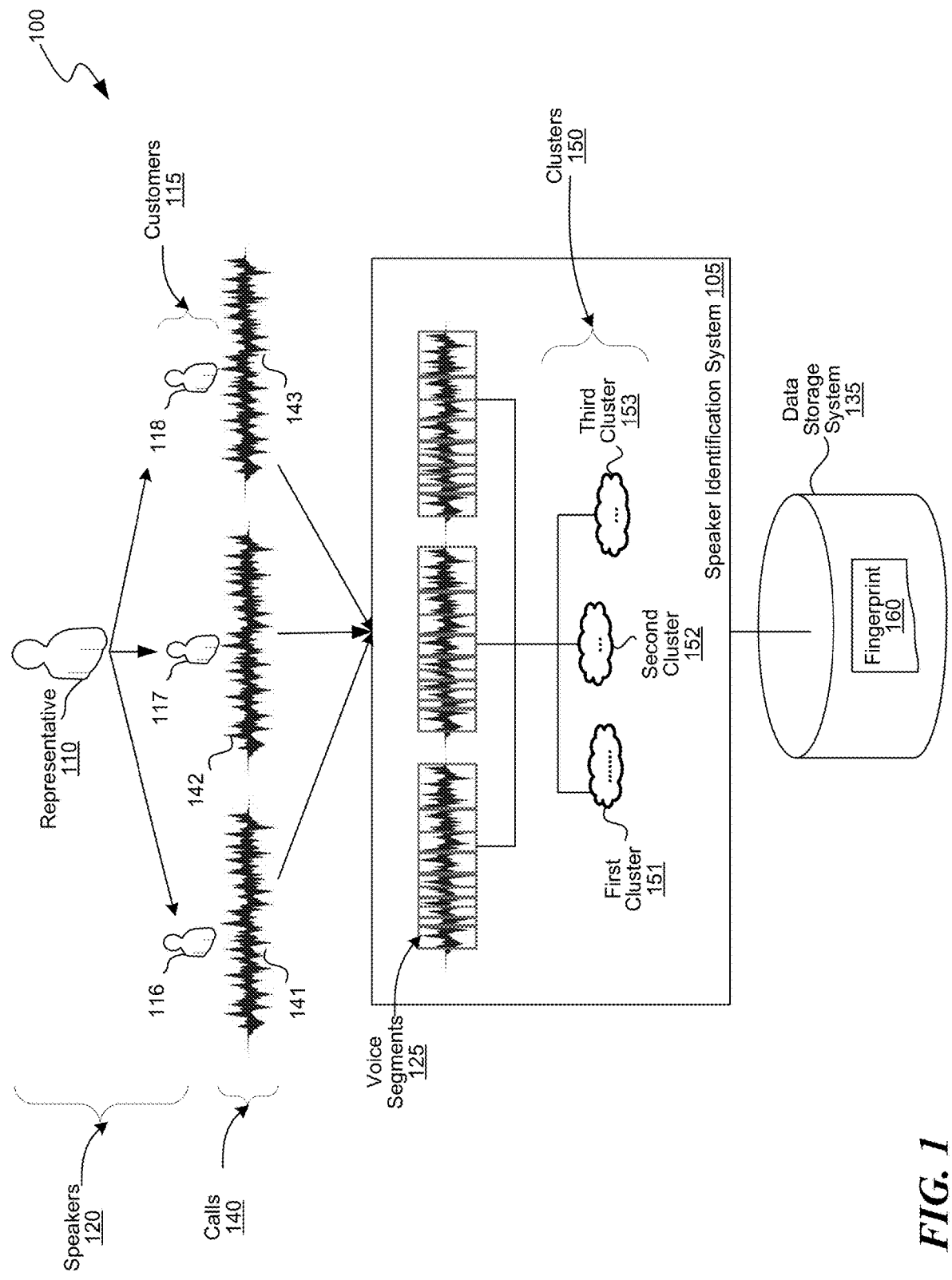
FIG. 1 is a block diagram of an environment in which the disclosed embodiments can be implemented.

Embodiments are directed to a speaker identification system for identifying a speaker in a conversation without requiring any voice sample or any other action from the speaker for identification purposes. The speaker identification system learns or generates a fingerprint of a speaker in an unsupervised manner, and uses such fingerprints for identifying a speaker in a particular conversation. The speaker identification system can generate fingerprints for and/or identify one or more speakers, e.g., employees or representatives of an organization, who take part in conversations with other speakers, e.g., customers of the organization. For example, to generate a fingerprint for a specified representative, the speaker identification system processes a number of calls the specified representative had with a number of customers to generate multiple voice segments for each of the calls, identifies the voice segments that satisfy a speaker identification criterion, e.g., voice segments having the same or a similar feature across all the calls, and determines the voice in the identified voice segments as the voice of the specified representative.

The feature can include at least one of a voice of the speaker, speech rate of the speaker, an accent of the speaker, linguistic attributes of the speaker, an ambient noise, a speech volume, a tone, a timber, emotions of the speaker (e.g., fear, anger, happiness, timidity, fatigue), personal attributes of the speaker (e.g., an age, an accent, and a gender), physical ailments of the speaker, physical conditions of the speaker, and level of education of the speaker.

The speaker identification system generates the fingerprint for the specified representative based on the identified voice segments, associates the fingerprint with the user ID of the specified representative, and stores the fingerprint in a data storage system. The data storage system can store fingerprints of multiple such speakers.

The speaker identification system can use the fingerprints from the data storage system to identify a representative in a conversation, such as a live or real-time conversation or a recording of a previous conversation. For example, consider that a representative is in conversation with a customer in a telephone call. The speaker identification system receives real-time conversation data, e.g., an audio stream of the telephone call, processes the audio stream to generate multiple voice segments and identifies groups of voice segments that have the same or a similar feature. A first group of voice segments can have the voice of a first speaker; a second group of voice segments can have the voice of a second speaker and so on. The speaker identification system then compares the groups of voice segments with the fingerprints from the data storage system to identify a matching fingerprint. If a matching fingerprint is found for a particular group of voice segments, the speaker identification system determines the representative in the real-time conversation as the representative corresponding to the user ID associated with the matching fingerprint. After the speaker identification system identifies the representative in the real-time conversation, the speaker identification system can identify the voice segments in the conversation in which the representative spoke, and mark those voice segments as having the voice of the identified representative.

The speaker identification system receives as input a call. In some embodiments, the calls can be associated with metadata, which can include information regarding identities of all or some speakers in the call. However, the information does not indicate which voice in the call belongs to which speaker. For example, for a call between a representative and one or more customers, the speaker identification system can receive as input the call and user identification (ID) of the representative. The metadata may optionally include some customer identification as well. In some embodiments, at least some portion of the metadata can be derived from video data of the call, e.g., visual data. In some embodiments, the calls are mono-channel, that is, the conversations are performed over a single communication channel.

Speaker identification can be used for various purposes. For example, in a customer care center scenario, the speaker identification can be used for analysis such as search, call visualization, identifying buying cues, extracting customer pain points, identifying good and/or bad sales behaviors, and extracting notes and tasks. As described above, the disclosed speaker identification system requires no voice print, user effort or explicit interaction by the user for identification purposes.

Note that a "call" is a recording of the conversation between two or more speakers and such conversations can be telephone based, Voice over Internet Protocol (VoIP) based, video conference based, Virtual Reality (VR) based, Augmented Reality (AR) based, or based on any online meetings, collaborations or interactions. Further, the call can also be a real-time data stream, e.g., audio stream, of a real-time interaction between the speakers.

Turning now to FIG. 1, FIG. 1 is a block diagram of an environment 100 in which the disclosed embodiments can be implemented. The environment 100 includes a speaker identification system 105 that facilitates unsupervised learning or generation of a speaker's fingerprint for identifying of a speaker in a conversation. The speaker identification system 105 analyzes a set of calls 140 to generate a fingerprint for one or more of the speakers 120 in the calls 140. The speakers 120 can include one or more speakers who are to be identified by the speaker identification system 105. For example, the speakers to be identified are representatives or employees of an organization such as a customer care center, who are in conversation with speakers who don't have to be identified, e.g., customers of the organization. The speaker identification system 105 can identify a representative in a particular conversation by analyzing one or more calls the representative has had with one or more customers.

The roles of the speaker to be identified and the speaker who need not be identified are not limited to the representative and customer roles or terminologies, respectively. Further, the term "speaker" can refer to either a speaker who is to be identified or speaker who need not be identified unless stated otherwise.

The speaker identification system 105 may not receive any input of voice samples, fingerprints or some other reference of a voice of the representative that identifies the representative. So, the speaker identification system 105 may have to generate the fingerprints, which can then be used for identifying a specified representative 110 in a specified conversation. The speaker identification system 105 can generate a fingerprint 160 for a specified representative 110 based on calls 140 the specified representative 110 has had with one or more customers 115. The speaker identification system 105 process the calls 140 to generate voice segments for each of the calls 140, analyzes the voice segments to identify a set of voice segments that satisfy the speaker identification criterion, e.g., share the same or similar feature across all the calls 140, and determines the voice in the set of voice segments as associated with the specified representative 110. The speaker identification system 105 generates a fingerprint 160 based on the identified set of voice segments, associates the fingerprint 160 with a user ID of the specified representative 110, and stores the fingerprint 160 in a data storage system 135. The following paragraphs describe additional details regarding the generation of the fingerprints.

In some embodiments, at least some of the calls 140 can include or be associated with metadata such as a user ID of the representative involved in the conversation. However, such metadata is optional and the speaker identification system 105 may not rely on the metadata for generating the fingerprints or for speaker identification purposes. The metadata can also have a customer ID of the customer involved in the conversation. However, the metadata would not indicate which voice in the call is of the corresponding representative. In some embodiments, the metadata can be derived video data of the call, e.g., visual data. For generating a fingerprint for a representative, the calls are selected such that (a) in at least some of the conversations the specified representative 110 is the only representative in conversation with the customers 115, that is, there is no other representative other than the specified representative 110, and (b) the customers 115 in different conversations are distinct. For example, to generate the fingerprint 160 of the specified representative 110, calls such as a first call 141 the specified representative 110 had with a first customer 116, a second call 142 with a second customer 117, a third call 143 with a third customer 118, and so on can be selected. Note that there can be more than one representative and/or customer in the conversation. However, when available, calls in which there is only one representative, e.g., the specified representative 110, and the customers are distinct in different calls are selected. The calls 140 can be stored in the data storage system 135.

The speaker identification system 105 can receive such calls 140, e.g., calls in which the customers are distinct and the specified representative 110 is the only representative, as an input, e.g., from a user associated with speaker identification system 105 or from another computing system. However, if the calls 140 are associated with metadata, the speaker identification system 105 can find and select such calls 140 using the metadata. In some embodiments, if the metadata does not include the customer IDs, the speaker identification system 105 can use other techniques, e.g., Speech, Language and Acoustic modeling techniques, to determine if the customers in each or at least some of the calls 140 are different.

After selecting the calls 140, the speaker identification system 105 processes each of the calls 140 to generate multiple voice segments, such as voice segments 125 of the first call 141. In some embodiments, a voice segment is a portion of a call that includes a human voice or a speech utterance by a human. In some embodiments, in generating the voice segments, the speaker identification system 105 can remove any background noise and/or portions that do not have a human voice, e.g., silence, music, etc., from each of the calls 140. Each of the resulting voice segments would have the voice of at least one of the speakers 120, e.g., the specified representative 110 or one of the customers 115.

The speaker identification system 105 analyzes each of the voice segments to identify the speakers 120 in the calls 140. For example, the speaker identification system 105 can cluster the voice segments to multiple clusters 150 to identify the speakers 120. The clustering process clusters the voice segments such that the voice segments that satisfy the speaker identification criterion are clustered into the same cluster. The clustering process can generate multiple clusters 150, e.g., a first cluster 151, a second cluster 152, and a third cluster 153. Typically, each cluster corresponds to voice segments of one of the speakers 120. In some embodiments, there can be more clusters than the number of speakers and/or voice segments of a speaker can be clustered into different clusters, e.g., due to some variations in the voice or background noise. However, various techniques can be used to refine the clustering process, which resolves such inconsistencies and clusters voice segments from the same speaker into the same cluster. The speaker identification system 105 can then identify a cluster, e.g., the first cluster 151, that matches a cluster selection criterion, e.g., having highest number of voice segments from each of the calls 140. The voice in the voice segments of the first cluster 151 are determined to be the voice of the specified representative 110. Since the specified representative 110 is on all or a marked majority of the calls 140 (if the calls 140 include calls without the specified representative 110), and not all the customers 115 are on all the calls 140, in some embodiments, the voice segments that overlap, e.g., have a similar or the same feature, across all the calls 140 are determined as likely to have the voice of the specified representative 110.

The speaker identification system 105 generates the fingerprint 160 for the specified representative 110 based on the voice segments in the first cluster 151. The fingerprint 160 is associated with the user ID of the specified representative 110 and stored in the data storage system 135. In some embodiments, the fingerprint 160 is representative of the feature based on which the clustering is implemented. That is, for example, if the clustering process clusters the voice segments into a cluster based on a voice of the speaker, then the fingerprint 160 is representative of the voice of the speaker. In another example, if the voice segments are clustered based on an accent or other linguistic attributes of the speaker, then the fingerprint 160 is representative of the accent or linguistic attributes voice of the speaker.

The speaker identification system 105 can repeat the above described process for other representatives of the organization for generating their fingerprints.

The clustering process can be implemented using various techniques, e.g., agglomerative clustering, K-means clustering, or density-based spatial clustering. The voice segments can be identified using various techniques, e.g., Gaussian Mixture Model (GMM)/Universal Background Model (UBM) or Deep Neural Networks (DNN). Further, the voice segments can be analyzed by generating or extracting i-vectors from the voice segments and clustering the i-vectors. In some embodiments, an i-vector is a data structure or a compact representation of speaker voice characteristics. An i-vector includes a value, which is representative of the speaker voice characteristics in the corresponding voice segment. The i-vectors can be extracted based on various features, e.g., features mentioned above. A fingerprint can also be generated using the i-vectors corresponding to the voice segments for which the i-vectors are extracted.

Further, the speaker identification system 105 can not only identify a particular representative but also representatives of a particular type, e.g., representatives of a specified age or age range, representatives having a specified accent, representatives of a specified gender, representatives having a specified physical ailment, physical condition, level of education, or other such features. For example, the clustering process can be implemented not only for identifying a particular representative but also for identifying representatives based on age, accent, gender, physical ailments, physical conditions, level of education, or other such features. Various technologies can be used to analyze the calls to identify the above features. The speaker identification system 105 can then group the voice segments based on one or more of the above features into multiple groups in which each of the groups corresponds to representatives of a particular type. For example, a first group of voice segments can correspond to "men," and a second group can correspond to "women." In another example, a group of the voice segments can correspond to speakers with "Alzheimer" physical condition, and another group can correspond to "women over 70 years" etc. The speaker identification system 105 can generate a fingerprint for each of the groups that corresponds to representatives of a particular type. The speaker identification system 105 can use the generated fingerprints to identify a type of the representative in a particular call, e.g., in any given call or a real-time call.

Note that although above paragraphs discuss selecting calls that have only one representative, the disclosed embodiments are not restricted to the described example. The speaker identification system 105 can generate the fingerprints for representatives by analyzing calls having multiple representatives as well.

Figure 2:
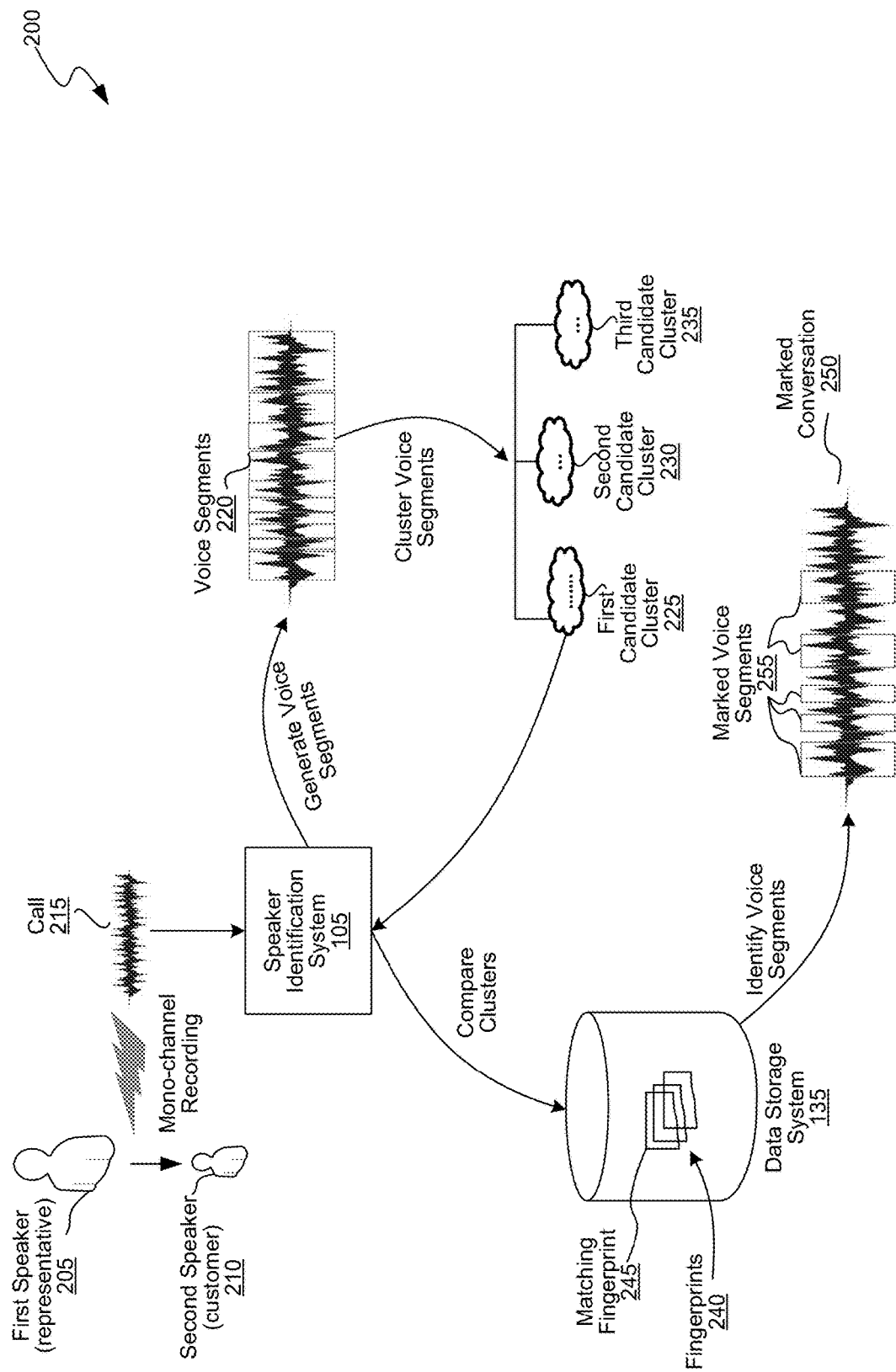
FIG. 2 is a block diagram of an example for identifying a speaker using the speaker identification system of FIG. 1, consistent with various embodiments.

FIG. 2 is a block diagram of an example 200 for identifying a speaker in a conversation using the speaker identification system of FIG. 1, consistent with various embodiments. The speaker identification system 105 can be used to identify a representative in a received call 215. The received call 215 can be of a conversation between a first speaker 205, who is a representative, and a second speaker 210, who is a customer, and can be a mono-channel call. Note that there can be more than two speakers; however, the number of speakers is limited to two in this example for ease of description. Further, the received call 215 can be a real-time data stream, e.g., audio stream, of a live conversation between the speakers, or a recording of a previous conversation.

The speaker identification system 105 processes the received call 215 to generate voice segments 220. For example, to generate the voice segments, the speaker identification system 105 can remove any background noise and/or portions that do not have a human voice, e.g., silence, music, etc., from the received call 215. The speaker identification system 105 then clusters the voice segments, e.g., as described above, into multiple clusters, e.g., a first candidate cluster 225, a second candidate cluster 230, and a third candidate cluster 235. In some embodiments, the clustering process clusters such that the voice segments satisfying the speaker identification criterion are clustered into the same cluster. As described above, each cluster corresponds to voice segments of one of the speakers. In some embodiments, voice segments of a speaker can be clustered into different clusters, e.g., due to some variations in the voice or background noise. However, various techniques can be used to refine the clustering process, which resolves such inconsistencies and clusters voice segments from the same speaker into the same cluster.

The speaker identification system 105 can then compare each of the clusters with the fingerprints 240 of various representatives stored in the data storage system 135. The speaker identification system 105 can use a matching algorithm to perform the comparing. If the speaker identification system 105 finds a matching fingerprint 245 for a particular cluster, e.g., the first candidate cluster 225, the speaker identification system 105 determines the voice in voice segments of the first candidate cluster 225 to be the voice of the representative associated with the matching fingerprint 245, e.g., the first speaker 205. The speaker identification system 105 assigns the voice segments in the first candidate cluster 225 to the first speaker 205, and generates a marked conversation 250, which indicates the voice segments or portions of the received call 215 where the first speaker 205 spoke. For example, the marked conversation 250 indicates the portions of the received call 215 where the first speaker 205 spoke as marked voice segments 255.

In some embodiments, the speaker identification system 105 performs the clustering and comparing by extracting i-vectors from the voice segments and then clustering and comparing of the extracted i-vectors with the fingerprints 240.

Figure 3:
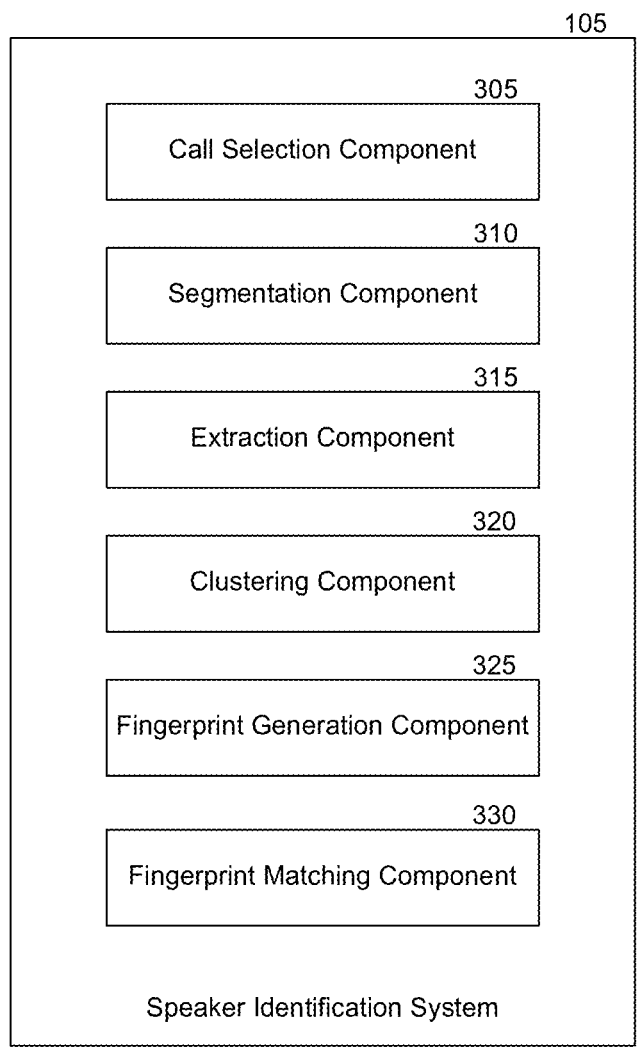
FIG. 3 is a block diagram of the speaker identification system of FIG. 1, consistent with various embodiments.

FIG. 3 is a block diagram of the speaker identification system of FIG. 1, consistent with various embodiments. The speaker identification system 105 includes a number of components that facilitate in generating fingerprints for speakers and identifying the speakers. For example, the components include a call selection component 305, a segmentation component 310, an extraction component 315, a clustering component 320, a fingerprint generation component 325 and a fingerprint matching component 330. The call selection component 305 enables selection of appropriate calls for generating a fingerprint for a representative. For example, to generate a fingerprint for the specified representative 110, the call selection component 305 can receive a set of calls, e.g., calls in which the customers are distinct across the calls and the specified representative 110 is the only representative, as an input. The call selection component 305 can receive the input from a user associated with speaker identification system 105, or from another computing system. However, if the calls 140 are associated with metadata, the call selection component 305 can select the set of calls, e.g., from the data storage system 135, using the metadata. Note that there can be more than one representative and/or customer in the call. However, the call selection component 305 selects, when available, calls in which there is only one representative, e.g., the specified representative 110, in conversation with the customers 115.

The segmentation component 310 enables generation of voice segments from the calls 140. In some embodiments, in generating the voice segments, the segmentation component 310 can remove any background noise and/or portions that do not have a human voice, e.g., silence, music, etc., from each of the calls 140. The segmentation component 310 can remove or reduce the background noise using various techniques, e.g., Latent Discriminant Analysis (LDA), probabilistic LDA, or DNN.

The extraction component 315 enables generation or extraction of i-vectors from the voice segments. The i-vectors can be extracted based on various features, e.g., features mentioned above. In some embodiments, the segmentation component 310 can remove or reduce background noise prior to the extraction of i-vectors.

The clustering component 320 can cluster the voice segments, e.g., the i-vectors extracted by the extraction component 315, to multiple clusters 150. The clustering component 320 clusters the voice segments such that the voice segments satisfying the speaker identification criterion are clustered into the same cluster. The clustering component 320 can use various techniques to resolve inconsistencies such as voice segments of the same speaker being clustered into different clusters. The clustering component 320 can identify one of the clusters 150 that satisfies the cluster selection criterion, and determines the voice in the voice segments of the identified cluster to be the voice of the specified representative 110.

The fingerprint generation component 325 can generate fingerprints for the representatives based on the voice segments in the clusters identified by the clustering component 320 for the corresponding representative. For example, the fingerprint generation component 325 generates the fingerprint 160 for the specified representative 110 based on the voice segments in the first cluster 151. The fingerprint 160 is associated with the user ID of the specified representative 110 and stored in the data storage system 135.

The fingerprint matching component 330 can be used to compare voice segments, e.g., i-vectors, in a cluster to fingerprints in the data storage system 135 to find a matching fingerprint. For example, the fingerprint matching component 330 can match clustered voice segments of a received call 215 with the fingerprints 240 in the data storage system 135 to find a matching fingerprint 245. The fingerprint matching component 330 can use various matching algorithms for comparing the clustered voice segments with the fingerprints.

Figure 4:
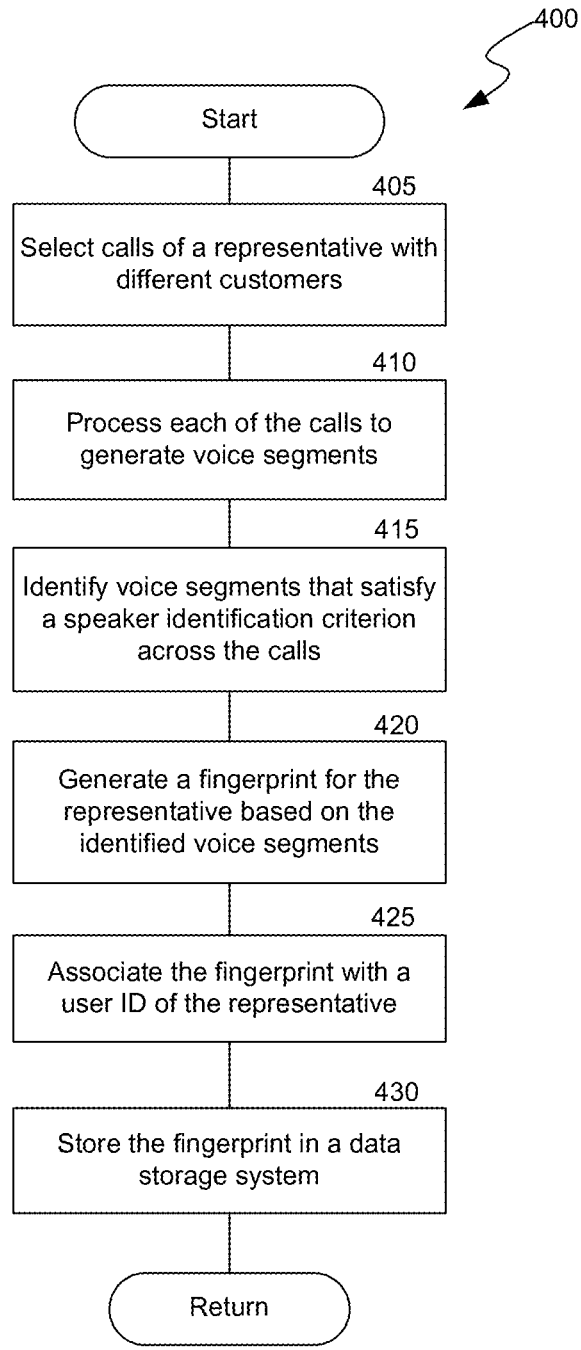
FIG. 4 is a flow diagram of a process for generating a fingerprint of a speaker, consistent with various embodiments.

FIG. 4 is a flow diagram of a process 400 for generating a fingerprint of a speaker, consistent with various embodiments. In some embodiments, the process 400 can be implemented using the speaker identification system of FIG. 1. At block 405, the call selection component 305 selects calls between a representative and different customers. For example, as described at least with reference to FIGS. 1 and 3, to generate a fingerprint for the specified representative 110, the call selection component 305 selects or receives calls 140 in which (a) the specified representative 110 is the only representative who is in conversation with the customers 115 in at least some of the calls, and (b) the customers 115 are distinct across the calls.

At block 410, the segmentation component 310 processes the selected calls to generate voice segments for each of the selected calls. For example, as described at least with reference to FIGS. 1 and 3, the segmentation component 310 can remove portions that do not have a human voice, e.g., silence, music, etc., from each of the calls 140 to generate the voice segments. The segmentation component 310 can also remove or reduce the background noise from each of the generated voice segments.

At block 415, the clustering component 320 identifies voice segments that satisfy a speaker identification criterion. For example, as described at least with reference to FIGS. 1 and 3, the clustering component 320 identifies those voice segments that have the same or similar feature across all the calls 140, and determines the voice in those voice segments to be the voice of the specified representative 110. Additional details with respect to identifying the voice segments that satisfy the speaker identification criterion are described at least with reference to FIG. 5 below.

At block 420, the fingerprint generation component 325 generates a fingerprint for the representative based on the voice segments identified in block 415. For example, as described at least with reference to FIGS. 1 and 3, the fingerprint generation component 325 generates the fingerprint 160 for the specified representative 110 based on the voice segments, e.g., i-vectors extracted from the voice segments, that have the same or similar feature across all the calls 140.

At block 425, the fingerprint generation component 325 associates the fingerprint with a user ID of the representative. For example, as described at least with reference to FIGS. 1 and 3, the fingerprint generation component 325 associates the fingerprint 160 with the user ID of the specified representative 110.

At block 430, the fingerprint generation component 325 stores the fingerprint generated in block 425 at the data storage system 135. For example, as described at least with reference to FIGS. 1 and 3, the fingerprint generation component 325 stores the fingerprint 160 at the data storage system 135.

Figure 5:
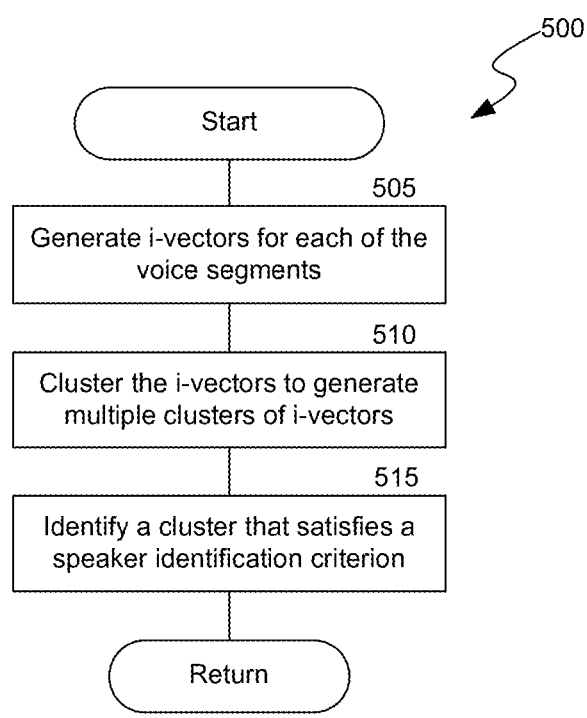
FIG. 5 is a flow diagram of a process for clustering voice segments of recordings, consistent with various embodiments.

FIG. 5 is a flow diagram of a process 500 for clustering the voice segments, consistent with various embodiments. In some embodiments, the process 500 can be implemented in the speaker identification system 105 of FIG. 1. In some embodiments, the process 500 can be implemented as part of block 415 of process 400. At block 505, the extraction component 315 generates i-vectors from each of the voice segments. In some embodiments, an i-vector is a data structure or a compact representation of speaker voice characteristics. An i-vector includes a value, which is representative of the speaker voice characteristics in the corresponding voice segment. The i-vectors can be extracted based on various features, e.g., features mentioned above, and can be generated using various known techniques.

At block 510, the clustering component 320 clusters the i-vectors to generate multiple clusters of i-vectors. The clustering component 320 clusters the i-vectors of the voice segments such that the voice segments satisfying the speaker identification criterion, e.g., that share the same or a similar feature, are clustered into the same cluster. The clustering component 320 can use various techniques to cluster the i-vectors, e.g., agglomerative clustering, K-means clustering, or density-based spatial clustering. In some embodiments, each of the clusters corresponds to a voice of one of the speakers.

At block 515, the clustering component 320 identifies one of the clusters that satisfies the cluster selection criterion, e.g., having highest number of voice segments from each of the calls selected in block 405 of process 400, and the process returns. For example, as described at least with reference to FIGS. 1 and 3, the clustering component 320 identifies the first cluster 151 as satisfying the cluster selection criterion, and determines the voice in the voice segments of the identified cluster to be the voice of the specified representative 110.

Figure 6:
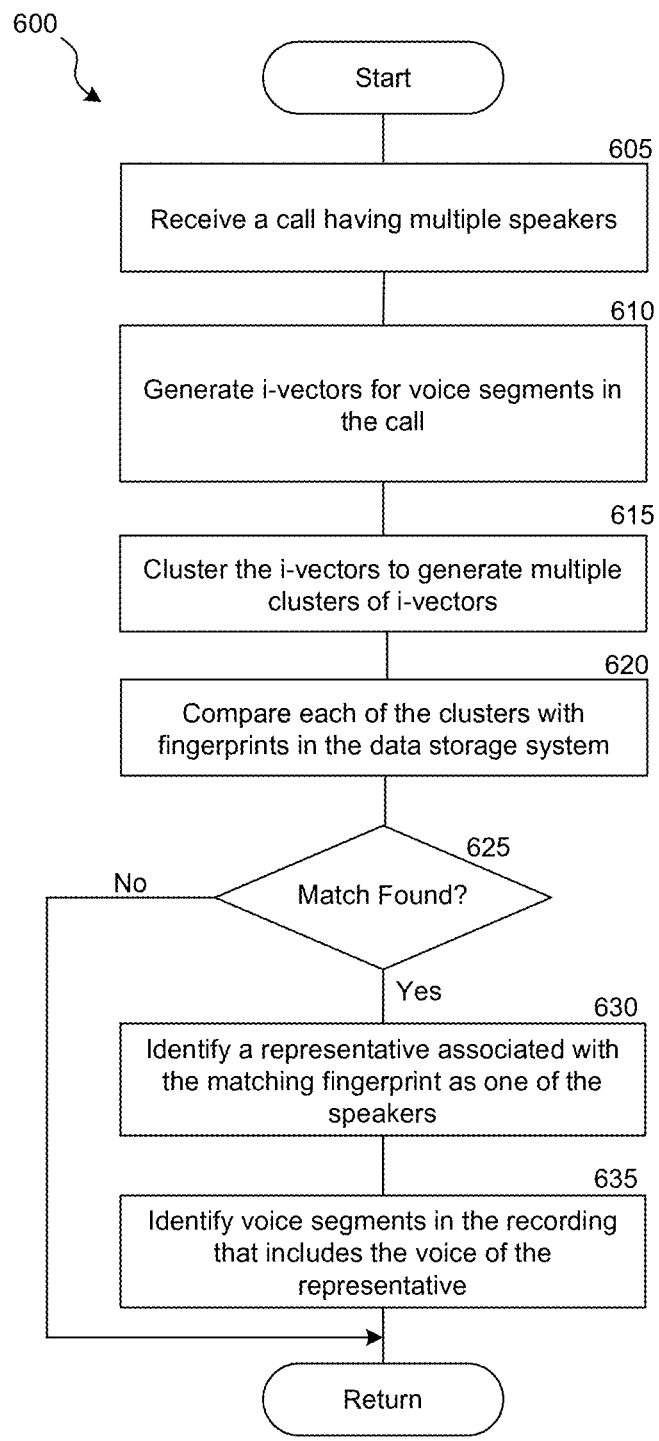
FIG. 6 is a flow diagram of a process for identifying a speaker in a conversation, consistent with various embodiments.

FIG. 6 is a flow diagram of a process 600 for identifying a speaker in a conversation, consistent with various embodiments. In some embodiments, the process 600 can be implemented in the speaker identification system 105 of FIG. 1. At block 605, the call selection component 305 receives a call between a representative and a customer, e.g., received call 215 of FIG. 2.

At block 610, the extraction component 315 generates i-vectors for various voice segments of the received call. For example, the extraction component 315 extracts the i-vectors from the voice segments 220 of the received call 215.

At block 615, the clustering component 320 clusters the i-vectors into multiple clusters. The clustering component 320 clusters the i-vectors of the voice segments such that the voice segments satisfying the speaker identification criterion, e.g., that share the same or a similar feature, are clustered into the same cluster. For example, the clustering component clusters the i-vectors to the first candidate cluster 225, the second candidate cluster 230, and the third candidate cluster 235.

At block 620, the fingerprint matching component 330 compares each of the clusters with the fingerprints stored in the data storage system. The fingerprint matching component 330 can use various matching algorithms for comparing the clustered i-vectors with the fingerprints.

At determination block 625, if the fingerprint matching component 330 finds a matching fingerprint for a particular cluster, at block 630, the fingerprint matching component 330 identifies the representative associated with the matching fingerprint as the representative who is in the conversation of the received call. On the other hand, if no matching fingerprint is found, the process returns.

At block 635, the fingerprint matching component 330 identifies the voice segments or portions of the received call where the identified representative spoke.

Figure 7:
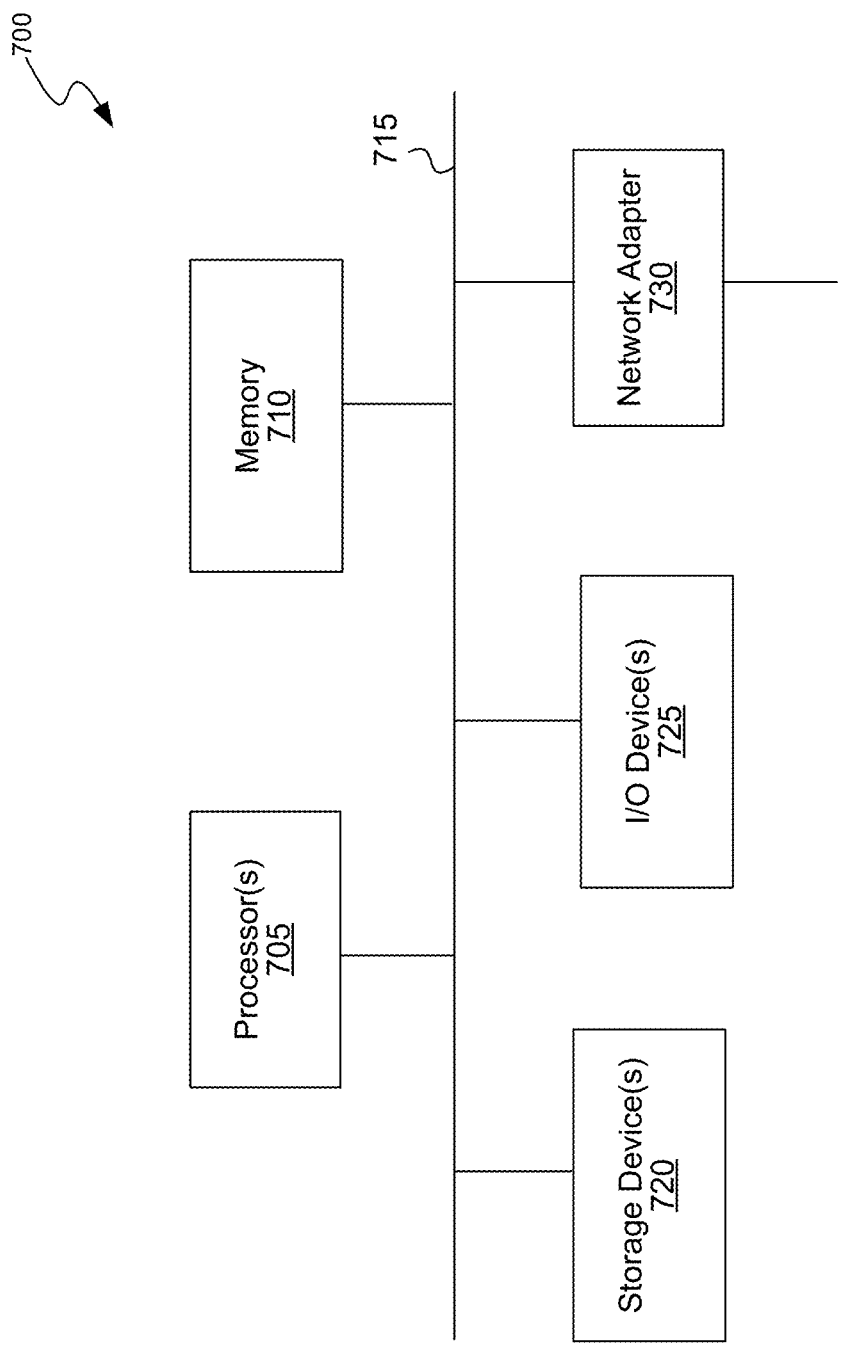
FIG. 7 is a block diagram of a processing system that can implement operations of the disclosed embodiments.

FIG. 7 is a block diagram of a computer system as may be used to implement features of the disclosed embodiments. The computing system 700 may be used to implement any of the entities, components or services depicted in the examples of the foregoing figures (and any other components described in this specification). The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Components (IEEE) standard 1394 bus, also called "Firewire".

The memory 710 and storage devices 720 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method, comprising:
    receiving, by a computer system, multiple recordings of conversations of a specified representative,
        wherein each of the recordings includes voice data of the corresponding conversation, and
        wherein different recordings are of conversations the specified representative had with different customers;
    generating, by the computer system, multiple voice segments for each of the recordings,
        wherein each voice segment corresponds to a voice of the specified representative or one of the customers;
    analyzing, by the computer system, the voice segments to identify a set of voice segments having features that correspond to the same speaker across all of the recordings;
    determining, by the computer system, that the set of voice segments include a voice of the specified representative;
    generating, by the computer system, a fingerprint for the specified representative based on the set of the voice segments,
        wherein the fingerprint is representative of a vocal characteristic of the specified representative derived from the set of the voice segments;
    storing, by the computer system, the fingerprint in a data storage system;
    receiving, by the computer system, a real-time voice data of a conversation between multiple parties;
    comparing, by the computer system, a subset of voice segments from the real-time voice data with multiple fingerprints associated with multiple representatives of an organization stored in the data storage system to identify a matching fingerprint,
        wherein the subset of voice segments corresponds to a voice of one of the multiple parties;
    identifying, by the computer system, a representative associated with the matching fingerprint as the representative to be associated with the subset of voice segments,
        wherein the representative is determined without obtaining a voice sample from the representatives for identification purpose; and
    generating a marked conversation by appending identification information only to the subset of voice segments associated with the representative in the real-time voice data.

2. The method of claim 1 further comprising:
    associating the fingerprint with a user identification (ID) of the specified representative.

3. The method of claim 1, wherein analyzing the multiple voice segments includes clustering the voice segments to generate multiple clusters of the voice segments, wherein each of the clusters corresponds to one or more voice segments of the specified representative or one of the customers.

4. The method of claim 3, wherein determining the set of voice segments as having the voice of the specified representative includes:
    identifying a cluster of the clusters that includes a highest number of voice segments from each of the recordings that correspond to a voice of the same speaker.

5. The method of claim 3, wherein the clustering includes clustering the voice segments based on a feature of each of the voice segments, wherein two or more voice segments having the same feature is clustered to a single cluster.

6. The method of claim 5, wherein the feature includes one or more of a voice of the speaker in the voice segment, an accent of the speaker, a speech rate of the speaker, a background noise in the voice segment, or linguistic attributes of the speaker.

7. The method of claim 5, wherein the feature is identified using one or more of a speech recognition technique, a speech identification technique, or a deep learning technique.

8. The method of claim 3, wherein the clustering is performed using one or more of agglomerative clustering, K-means clustering, or density-based spatial clustering.

9. The method of claim 1, wherein generating the multiple voice segments includes generating the multiple voice segments using Gaussian mixture model-universal background model or deep neural networks.

10. The method of claim 1, wherein generating the multiple voice segments includes generating one or more i-vector data structures for each of the multiple voice segments, wherein each of the i-vector data structures includes a value representative of features of the corresponding voice segment.

11. The method of claim 10, wherein determining the set of voice segments as having the voice of the specified representative includes determining that a set of i-vector data structures corresponding to the set of voice segments have the same value or have values that differ from each other within a specified threshold.

12. The method of claim 1, wherein generating the fingerprint includes generating one or more i-vectors that represents the set of voice segments.

13. The method of claim 1, wherein analyzing the voice segments includes processing the voice segments to eliminate one or more of (a) noise, (b) music, (c) silence, or (d) a portion that does not have a voice of the specified representative or any of customers from the voice segments.

14. The method of claim 1, wherein receiving the recordings includes:
receiving a set of recordings of conversations between multiple representatives and multiple customers, wherein each recording corresponds to a conversation between at least one of the representatives and one or more of the customers, and
identifying, from the set of recordings, a first subset of recordings of conversations (a) having the specified representative as the at least one of the representatives, and (d) having distinct customers in distinct conversations.

15. The method of claim 1, wherein each of the recordings is a mono-channel recording in which a speech of all speakers in the corresponding conversation is over a single communication channel.

16. The method of claim 1, wherein at least some of the recordings are associated with metadata, wherein the metadata includes a user ID of the specified representative or other information necessary for speaker identification.

17. The method of claim 16, wherein the metadata includes data derived from video data of the corresponding recording.

18. The method of claim 1, wherein generating the fingerprint further includes:
grouping voice segments based on a feature to generate multiple groups of voice segments, wherein the feature corresponds to at least one of an age of a speaker of speakers in the conversations, a gender of the speaker, physical ailments of the speaker, physical conditions of the speaker, a level of education of the speaker; and
generating a set of fingerprints for the groups, wherein each fingerprint from the set of fingerprints identifies one or more speakers having the same feature.

19. A non-transitory computer-readable storage medium storing computer-readable instructions, comprising:
instructions for receiving recordings of multiple conversations,
wherein each of the conversations is between a specified representative of an organization and one or more customers, and
wherein different conversations are with different customers;
instructions for identifying multiple voice segments for each of the recordings,
wherein each voice segment corresponds to a voice of one of multiple speakers;
instructions for generating, for each of the voice segments, one or more multiple i-vector data structures,
wherein each of the i-vector data structures represents a feature of the corresponding voice segment;
instructions for clustering the i-vector data structures to identify the speakers in the recordings,
wherein each of the clusters includes i-vector data structures corresponding to one of the multiple speakers;
instructions for determining a specified cluster of the clusters that includes a highest number of i-vector data structures from each of the conversations, the specified cluster representing a voice of the specified representative;
instructions for generating a fingerprint for the specified representative based on i-vector data structures from the specified cluster;
instructions for receiving real-time voice data of a conversation between the multiple speakers;
instructions for comparing a set of i-vector data structures generated from the real-time voice data with multiple fingerprints associated with multiple representatives stored in a data storage system to identify a matching fingerprint;
instructions for identifying a representative associated with the matching fingerprint as one of the speakers in the conversation,
wherein the representative is identified without obtaining a voice sample from the representatives for identification purpose; and
instructions for generating a marked conversation by appending identification information only to the set of i-vector data structures associated with the representative in the real-time voice data.

20. The non-transitory computer-readable storage medium of claim 19, wherein the feature includes at least one of a voice characteristic or a non-voice characteristic associated with the corresponding voice segment.

21. The non-transitory computer-readable storage medium of claim 20, wherein the voice characteristic includes at least one of a voice of a speaker in the corresponding voice segment, an accent of the speaker, a speech rate of the speaker, a background noise in the corresponding voice segment.

22. The non-transitory computer-readable storage medium of claim 20, wherein the non-voice characteristic includes at least one of a speech pattern of the speaker, or linguistic attributes of the speaker.

23. The non-transitory computer-readable storage medium of claim 19, wherein the instructions for clustering includes:
instructions for generating a first cluster of multiple clusters by clustering two or more i-vector data structures corresponding to voice segments having a voice of a first speaker of the multiple speakers, and
instructions for generating a second cluster of multiple clusters by clustering two or more i-vector data structures corresponding to voice segments having a voice of a second speaker of the multiple speakers.

24. The non-transitory computer-readable storage medium of claim 19 further comprising:

instructions for identifying multiple voice segments in the conversation having speech uttered by the representative.

25. The non-transitory computer-readable storage medium of claim 19, wherein the instructions for comparing include:
   instructions for clustering the set of i-vector data structures to generate multiple clusters of i-vector data structures, wherein each cluster includes a subset of the set of i-vector data structures that corresponds to one of the speakers, and
   instructions for comparing each of the clusters of i-vector data structures with the fingerprints.

26. The non-transitory computer-readable storage medium of claim 19, wherein at least one of the conversations includes a video call between the specified representative and the one or more customers.

27. The non-transitory computer-readable storage medium of claim 19, wherein at least one of the conversations includes an online meeting between the specified representative and the one or more customers.

28. The non-transitory computer-readable storage medium of claim 19, wherein at least one of the conversations includes a virtual reality-based conversation between the specified representative and the one or more customers.

29. The non-transitory computer-readable storage medium of claim 19, wherein at least one of the conversations includes an augmented reality-based conversation between the specified representative and the one or more customers.

30. A system, comprising:
   a first component configured to receive multiple recordings of multiple conversations between multiple speakers,
      wherein at least a majority of the recordings includes a specified speaker of the speakers conversing with one or more of remaining speakers of the speakers, and
      wherein the one or more of remaining speakers are different in different conversations;
   a second component configured to generate multiple voice segments for each of the recordings,
      wherein each voice segment corresponds to a voice of the specified speaker or one of the remaining speakers;
   a third component configured to:
      analyze the voice segments to identify a set of voice segments having features that correspond to the same speaker across all of the recordings, and
      determine the set of voice segments as having a voice of the specified speaker; and
   a fourth component configured to generate a fingerprint for the specified speaker based on the set of the voice segments;
   wherein the first component is configured to receive a real-time voice data of a conversation between multiple parties; and
   a fifth component configured to:
      compare a subset of voice segments from the real-time voice data with multiple fingerprints associated with multiple representatives of an organization stored in a data storage system to identify a matching fingerprint, wherein the subset of voice segments corresponds to a voice of one of the parties,
      identify a representative associated with the matching fingerprint as the representative to be associated with subset of voice segments,
         wherein the representative is determined without obtaining a voice sample from the representatives for identification purpose, and
      generate a marked conversation by appending identification information only to the subset of voice segments associated with the representative in the real-time voice data.

* * * * *